(12) United States Patent
Prokhorov

(10) Patent No.: US 9,875,583 B2
(45) Date of Patent: Jan. 23, 2018

(54) VEHICLE OPERATIONAL DATA ACQUISITION RESPONSIVE TO VEHICLE OCCUPANT VOICE INPUTS

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/886,288

(22) Filed: Oct. 19, 2015

(65) Prior Publication Data
US 2017/0109947 A1 Apr. 20, 2017

(51) Int. Cl.
*G07C 5/08* (2006.01)
*G10L 15/22* (2006.01)

(52) U.S. Cl.
CPC ........ *G07C 5/0816* (2013.01); *G07C 5/085* (2013.01); *G07C 5/0841* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 4,532,648 A | * | 7/1985 | Noso | B60R 16/0373 381/104 |
| 4,593,403 A | * | 6/1986 | Kishi | B60R 16/0373 381/110 |
| 4,827,520 A | * | 5/1989 | Zeinstra | B60R 16/0373 701/1 |
| 8,428,811 B2 | | 4/2013 | Cahill et al. | |
| 8,654,936 B1 | * | 2/2014 | Eslambolchi | H04L 12/2818 379/88.04 |
| 8,947,220 B2 | * | 2/2015 | Martin | G10L 15/22 340/4.14 |
| 2005/0035855 A1 | * | 2/2005 | Sarnowsky | G08C 17/00 340/531 |
| 2006/0012884 A1 | * | 1/2006 | Snorteland | B60R 11/02 359/630 |

(Continued)

OTHER PUBLICATIONS

Michael Andronico, "AT&T Lets You Voice Control Your Home From Your Car", retrieved from the Internet: <http://www.tomsguide.com/us/att-innovation-showcase,news-20903.html>, retrieved Jul. 7, 2015, dated May 8, 2015 (6 pages).

*Primary Examiner* — Krishnan Ramesh
(74) *Attorney, Agent, or Firm* — Christopher G. Darrow; Darrow Mustafa PC

(57) ABSTRACT

Vehicle operational data can be acquired in response to receiving a vehicle occupant voice command. A voice input can be received from a vehicle occupant while a vehicle is in operation. The received voice input can be analyzed to determine whether a vehicle diagnostic command is included in the voice input. In response to determining that a vehicle diagnostic command is included in the received voice input, one or more vehicle sensors can be caused to acquire vehicle operational data based on the vehicle diagnostic command. The vehicle operational data can be presented to a user, such as a driver, a passenger, or a review entity.

16 Claims, 3 Drawing Sheets

(56) References Cited

U.S. PATENT DOCUMENTS

| | | | |
|---|---|---|---|
| 2007/0073543 A1* | 3/2007 | Hammler | B60R 16/0373 704/275 |
| 2008/0133230 A1* | 6/2008 | Herforth | G01C 21/26 704/235 |
| 2008/0161988 A1* | 7/2008 | Oesterling | G07C 5/008 701/31.4 |
| 2008/0208403 A1* | 8/2008 | Bertosa | G07C 5/0808 701/31.4 |
| 2008/0269978 A1* | 10/2008 | Shirole | G07C 5/008 701/29.5 |
| 2009/0024707 A1* | 1/2009 | Aase | G10L 15/26 709/206 |
| 2009/0070034 A1* | 3/2009 | Oesterling | G01C 21/3629 701/533 |
| 2009/0177354 A1* | 7/2009 | Agrawal | G01M 17/007 701/33.4 |
| 2010/0076644 A1* | 3/2010 | Cahill | G07C 5/0808 701/31.4 |
| 2012/0274459 A1* | 11/2012 | Jaisimha | H04H 20/31 340/438 |
| 2013/0191132 A1* | 7/2013 | Tanaka | G10L 21/06 704/275 |
| 2013/0278769 A1* | 10/2013 | Nix | H04N 7/18 348/148 |
| 2013/0332004 A1* | 12/2013 | Gompert | G07C 5/008 701/1 |
| 2014/0142948 A1* | 5/2014 | Rathi | G06F 3/167 704/270.1 |

* cited by examiner

VEHICLE OPERATIONAL DATA ACQUISITION RESPONSIVE TO VEHICLE OCCUPANT VOICE INPUTS

FIELD

The subject matter described herein relates in general to vehicles and, more particularly, to the interaction between a vehicle and a vehicle occupant.

BACKGROUND

While driving a vehicle, a driver may notice a less-than satisfactory behavior of the vehicle or other issue associated with the vehicle. The driver may wish to bring such behavior to the attention of an automotive service facility, who may be able to diagnose whether there is a problem. In order to do so, the driver must remember to bring it up at the appropriate time. A driver can do so by making a mental note, or the driver can write a note on a piece of paper. Further, a driver may record a voice message for himself or herself. Such techniques can help the driver to subsequently recall the vehicle's behavior or other issue and address it.

SUMMARY

In one respect, the subject matter described herein relates to a method of acquiring diagnostic data for a vehicle. The method includes receiving a voice input from a vehicle occupant while the vehicle is in operation. The method also includes analyzing the received voice input to determine whether a vehicle diagnostic command is included in the voice input. The method further includes, responsive to detecting that a vehicle diagnostic command is included in the received voice input, causing one or more vehicle sensors to acquire vehicle operational data based on the vehicle diagnostic command. The method can include presenting the vehicle operational data to a user.

In another respect, the subject matter described herein relates to a vehicle having a voice-based user interface for vehicle occupants. The vehicle includes a sensor system including a plurality of sensors. The plurality of sensors can be distributed about a plurality of different locations of the vehicle. The vehicle can also include a processor operatively connected to receive vehicle operational data from the sensor system. The processor can be programmed to initiate executable operations. The executable operations can include responsive to receiving a voice input from a vehicle occupant while the vehicle is in operation, analyzing the received voice input to determine whether a vehicle diagnostic command is included in the voice input. The executable operations can include, responsive to detecting that a vehicle diagnostic command is included in the received voice input, causing one or more vehicle sensors to acquire vehicle operational data based on the vehicle diagnostic command.

DETAILED DESCRIPTION

Arrangements of vehicles presented herein can enable a vehicle occupant to provide voice inputs to acquire vehicle operational data. A voice input can be received from a vehicle occupant while the vehicle is in operation. The received voice input can be analyzed to determine whether a command is included in the voice input. In response to determining that a command is included in the received voice input, one or more actions can be caused to occur. For instance, if the command is a vehicle diagnostic command, one or more vehicle sensors can acquire vehicle operational data based on the received command. Arrangements described herein can facilitate interaction between a vehicle and one or more vehicle occupants, and arrangements can provide convenience and safety to vehicle occupants.

Figure 2:
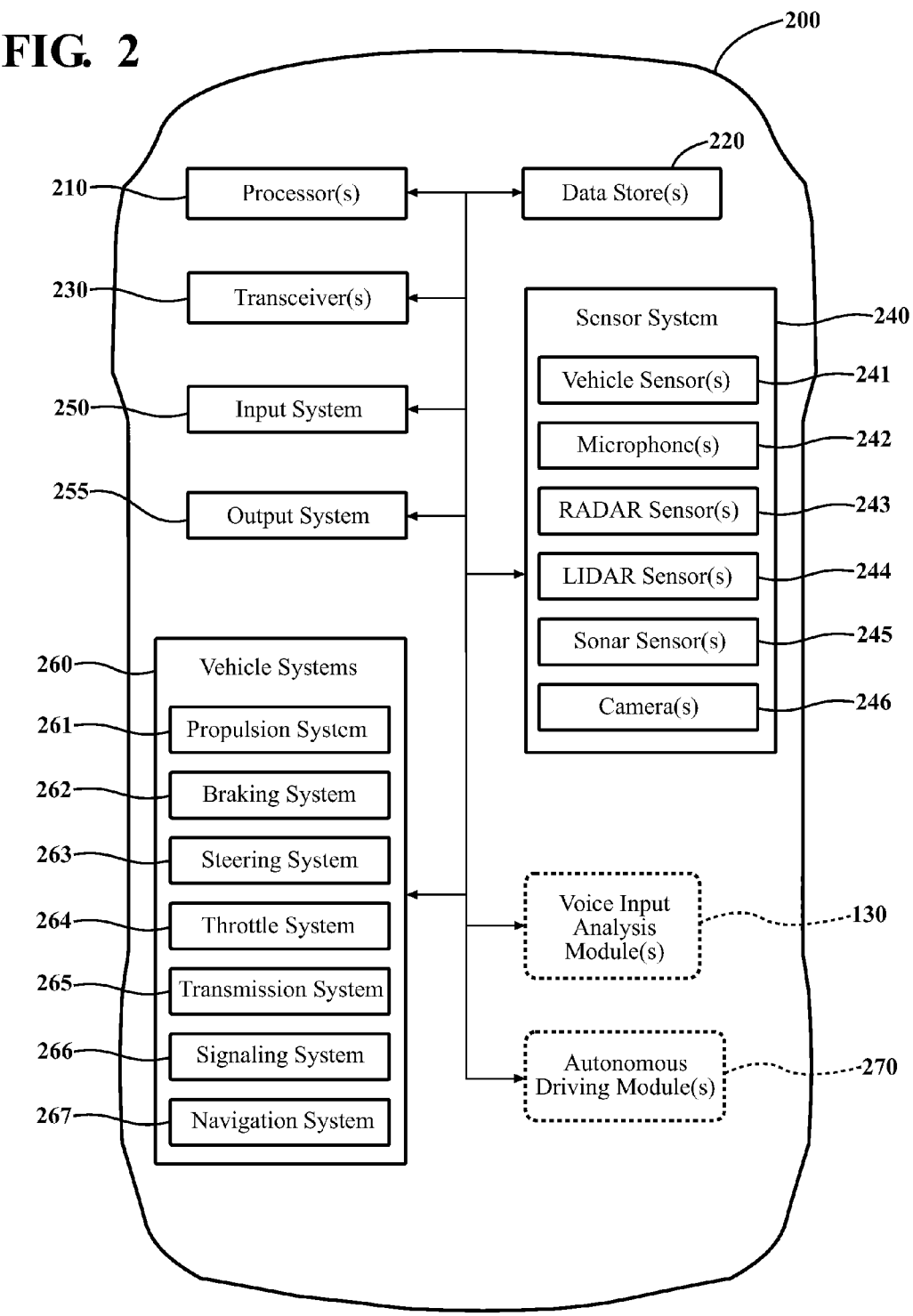
FIG. 2 is an example of a vehicle configured to acquire vehicle operational data responsive to receiving an occupant voice input.
Figure 3:
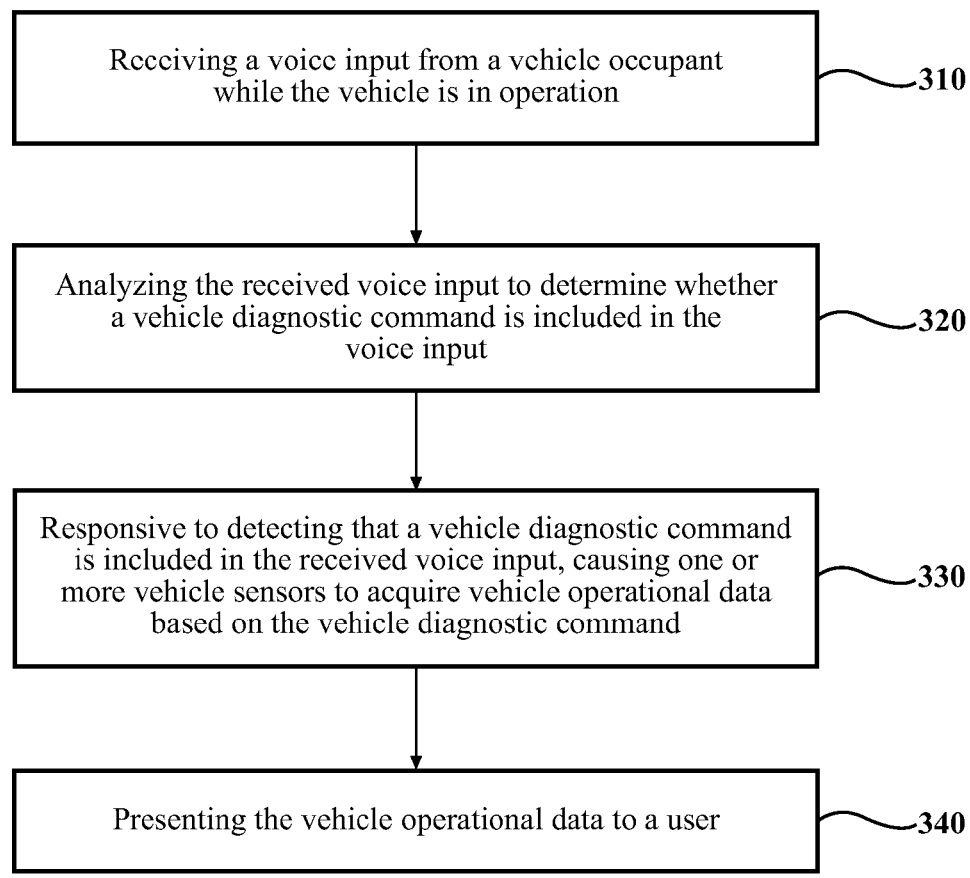
FIG. 3 is an example of a method of acquiring vehicle operational data responsive to receiving an occupant voice input.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
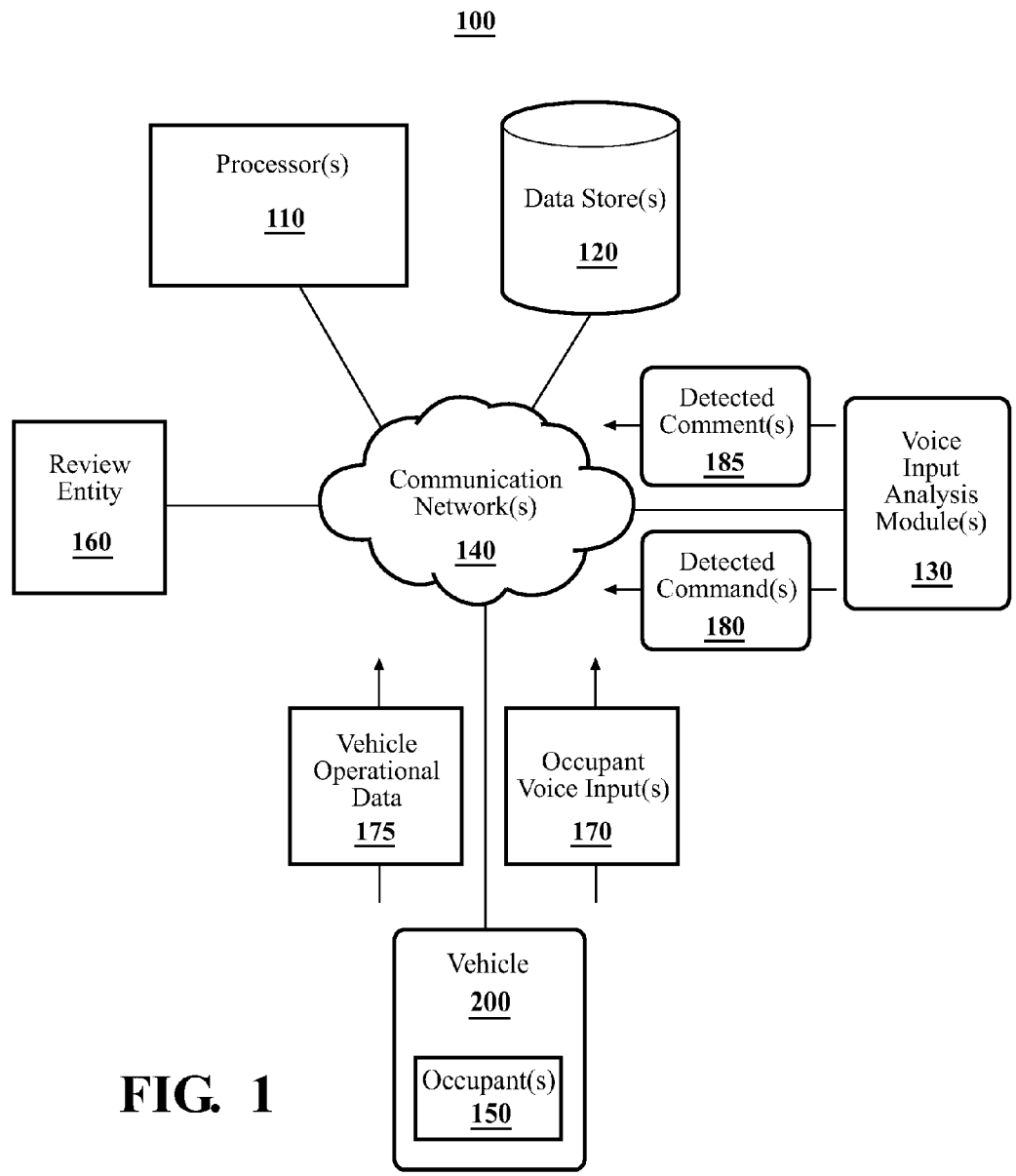
FIG. 1 is an example of a system for acquiring vehicle operational data responsive to receiving an occupant voice input.

FIG. 1 is an example of a system 100 for acquiring vehicle operational data responsive to receiving an occupant voice input. Some of the possible elements of the system 100 are shown in FIG. 1 and will now be described. It will be understood that it is not necessary for the system 100 to have all of the elements shown in FIG. 1 or described herein. The system 100 can include a one or more processor(s) 110, one or more data store(s) 120, one or more voice input analysis module(s) 130, a vehicle 200, and/or one or more review entities 160.

The various elements of the system 100 can be communicatively linked through one or more communication networks 140. As used herein, the term "communicatively linked" can include direct or indirect connections through a communication channel or pathway or another component or system. A "communication network" means one or more components designed to transmit and/or receive information from one source to another.

The one or more communication networks 140 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 140 further can be implemented as or include one or more wireless networks, whether short or long range. For example, in terms of short range wireless networks, the communication network 140 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 140 can include a mobile, cellular, and or satellite-based wireless network and support voice, video, text, and/or any combination thereof. Examples of long range wireless networks can include GSM, TDMA, CDMA, WCDMA networks or the like. The communication network 140 can include wired communication links and/or wireless communication links. The communication network 140 can include any combination of the above networks and/or other types of networks. The communication network 140 can include one or more routers, switches, access points, wireless access points, and/or the like.

One or more elements of the system include and/or can execute suitable communication software, which enables two or more of the elements to communicate with each other through the communication network 140 and perform the functions disclosed herein. For instance, the vehicle 200 can be configured to receive one or more occupant voice inputs 170 from one or more vehicle occupant(s) 150. The occupant voice input(s) 170 can be sent or otherwise provided to the voice input analysis module(s) 130, the data store(s) 120, and/or the processor(s) 110. The voice input analysis module(s) 130 can be configured to analyze the occupant voice input(s) 170 to detect whether one or more commands 180 and/or one or more comments 185 are included.

Detected command(s) 180 can be processed in various ways. For instance, detected command(s) 180 can be processed by the vehicle 200, the processor(s) 110, and/or some other element. In one or more arrangements, the detected command(s) 180 can be processed to cause vehicle operational data 175 to be acquired by the vehicle 200. The acquired vehicle operational data 175 can be sent or otherwise provided to the processor(s) 110, the data store(s) 120, and/or the one or more review entities 160.

As noted above, the system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

In one or more arrangements, one or more processors 110 can be located onboard the vehicle 200. In one or more arrangements, one or more processors 110 can be located remote from the vehicle 200. For instance, one or more processors 110 can be a remote server or part of a remote server. In one or more arrangements, one or more of the processors 110 can be located onboard the vehicle 200, and one or more of the processors 110 can be located remote from the vehicle 200.

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

In one or more arrangements, one or more data stores 120 can be located onboard the vehicle 200. In one or more arrangements, one or more data stores 120 can be located remote from the vehicle 200. In one or more arrangements, one or more data stores 120 can be located onboard the vehicle 200, and one or more data stores 120 can be located remote from the vehicle 200.

The voice input analysis module(s) 130 and/or the data store(s) 120 can be components of the processor(s) 110. In one or more arrangements, the voice input analysis module(s) 130 and/or the data store(s) 120 can be stored on, accessed by and/or executed on the processor(s) 110. In one or more arrangements, the voice input analysis module(s) 130 and/or the data store(s) 120 can be executed on and/or distributed among other processing systems to which the processor(s) 110 is communicatively linked. For instance, at least a portion of the voice input analysis module(s) 130 can be located onboard the vehicle 200. In one or more arrangements, a first portion of the voice input analysis module(s) 130 can be located onboard the vehicle 200, and a second portion of the voice input analysis module(s) 130 can be located remote from the vehicle 200 (e.g., on a cloud-based server, a remote computing system, and/or the processor(s) 110). In one or more arrangements, the voice input analysis module(s) 130 can be located remote from the vehicle 200.

The voice input analysis module(s) 130 can be implemented as computer readable program code that, when executed by a processor, implement one or more of the various processes described herein. The voice input analysis module(s) 130 can be a component of one or more of the processor(s) 110 or other processor(s) (e.g., one or more processors(s) 210 of the vehicle 200 (see FIG. 2), or the voice input analysis module(s) 130 can be executed on and/or distributed among other processing systems to which one or more of the processor(s) 110 is operatively connected. In one or more arrangements, the voice input analysis module(s) 130 can include artificial or computational intelligence elements, e.g., neural network, fuzzy logic or other machine learning algorithms.

The voice input analysis module(s) 130 can include instructions (e.g., program logic) executable by a processor. Alternatively or in addition, one or more of the data stores 120 may contain such instructions. Such instructions can include instructions to execute various functions and/or to transmit data to, receive data from, interact with, and/or control: one or more elements of the system 100. Such instructions can enable the various elements of the system 100 to communicate through the communication network 140.

The voice input analysis module(s) 130 can receive occupant voice input(s) 170 from one or more vehicle occupant(s) 150 of the vehicle 200. The occupant voice input(s) 170 can include any audial data spoken, uttered, exclaimed, pronounced, exclaimed, vocalized, verbalized, voiced, emitted, articulated, and/or stated aloud by a vehicle occupant 150. The occupant voice input(s) 170 can include one or more letters, one or more words, one or more phrases, one or more sentences, one or more numbers, one or more expressions, and/or one or more paragraphs, just to name a few possibilities.

The occupant voice input(s) 170 can be sent to, provided to, and/or otherwise made accessible to the voice input analysis module(s) 130. The voice input analysis module(s) 130 can be configured to analyze the occupant voice input(s) 170. The voice input analysis module(s) 130 can analyze the occupant voice input(s) 170 in various ways. For instance, the voice input analysis module(s) 130 can analyze the occupant voice input(s) 170 using any known natural language processing system or technique. Natural language processing can include analyzing each occupant voice input 170 for deep semantic relationships and keywords. Natural language processing can also include semantics detection and analysis and any other analysis of data including textual data and unstructured data. Semantic analysis can include deep and/or shallow semantic analysis. Natural language processing can also include discourse analysis, machine translation, morphological segmentation, named entity recognition, natural language understanding, optical character recognition, part-of-speech tagging, parsing, relationship extraction, sentence breaking, sentiment analysis, speech recognition, speech segmentation, topic segmentation, word segmentation, stemming and/or word sense disambiguation. Natural language processing can use stochastic, probabilistic and statistical methods.

The voice input analysis module(s) 130 can analyze the occupant voice input(s) 170 to detect whether one or more commands 180 and/or one or more comments 185 are included in the occupant voice input(s) 170. The voice input analysis module(s) 130 can analyze the occupant voice input(s) 170 in real-time or at a later time. As used herein, the term "real time" means a level of processing responsiveness that a user or system senses as sufficiently immediate for a particular process or determination to be made, or that enables the processor to keep up with some external process.

A "command" can be any request to take an action and/or to perform a task. A "comment" can be anything spoken, uttered, exclaimed, pronounced, exclaimed, vocalized, verbalized, voiced, emitted, articulated, and/or stated aloud by a vehicle occupant that is not a command and/or that is indicated or designated by the vehicle occupant as being a comment, remark, observation, note, or memo.

In one or more arrangements, the detected command(s) 180 can be processed by the vehicle 200 for implementation. In one or more arrangements, the detected command(s) 180 can be vehicle diagnostic commands. Vehicle diagnostic commands can include commands to acquire data that relates to a perceived or potential problem with the vehicle 200 and/or to an unusual occurrence relating to or encountered by the vehicle 200. Vehicle diagnostic commands can include commands to acquire data relating to the performance of the vehicle or an element, system, or component thereof. Vehicle diagnostic commands can include commands to acquire data relating to improving the performance of the vehicle or to an element, system, device, and/or component thereof.

The detected command(s) 180 can be implemented so that vehicle operational data 175 is obtained. "Vehicle operational data" includes any data or information relating to a vehicle during operation or to a portion (e.g., an element, system, device, and/or component) of the vehicle. Vehicle operational data can include any type of data, including, for example, audial data and/or other kinds of data.

Vehicle operational data 175 can include vehicle-based data and/or driving environment data. Non-limiting examples of vehicle-based data can include information or data about the speed, acceleration, deceleration, braking, steering, pedal usage, gas consumption, position of the vehicle within a travel lane, a route traveled by the vehicle 200, telematics, GPS data, and/or location data of the vehicle 200. The vehicle-based data can vehicle audial data, which can include sounds and/or noises produced by or otherwise being emitted by, from, or near the vehicle 200 or a portion (e.g., an element, system, device, and/or component) of the vehicle 200. The vehicle-based data can be obtained, acquired, and/or received from the vehicle 200. As will be explained in more detail later in this description, the vehicle 200 can include one or more sensors to acquire such data.

"Driving environment data" includes any information or data about the external environment in which the vehicle operates. Various non-liming examples of driving environment data include the presence of static and/or dynamics objects in the external environment of the vehicle 200, the proximity of the vehicle 200 to the objects, information about the objects, lane markers, traffic signaling devices (e.g., signs, lights, etc.), traffic rules (e.g., speed limits), and/or map data, just to name a few possibilities. The driving environment data can include weather conditions, road conditions, the current time, and/or traffic conditions. In one or more arrangements, the driving environment data can be obtained, acquired, and/or received from the vehicle 200. The vehicle 200 can include one or more sensors and/or other components to acquire such data.

The vehicle operational data 175 can be acquired at any suitable time. For instance, the vehicle operational data 175 can be acquired responsive to receiving a command 180. The vehicle operational data 175 can continue to be acquired for a predetermined period of time thereafter or until an indication to stop is received. The vehicle operational data 175 can be acquired for a period of time specified by the vehicle occupant in the command 180.

In one or more arrangements, one or more directional indicators can be included in the voice input or a command 180. The directional indicator can specify some subset of the vehicle operational data 175 that can be acquired. As an example, a directional indicator can specify a subset of the driving environment (e.g., forward, rear, right lateral side, left lateral side of the driving environment, and/or combinations thereof). As another example, a directional indicator can specify a particular area of the vehicle 200 and/or one or more particular vehicle systems. For instance, a vehicle occupant may wish to record sounds from one or more particular areas of the vehicle 200 (e.g., forward, rear, right lateral side, left lateral side of the vehicle, and/or combinations thereof, under the hood, one or more tires or wheel wells, etc.). Alternatively or in addition, a vehicle occupant may wish to record sounds from a particular vehicle system (e.g., a braking system, a steering system, propulsion system, etc.) or component (e.g., the engine, the brakes, the wheel(s), etc.).

In some instances, the one or more review entities 160 can include any entity that can review vehicle operational data 175 to diagnose the vehicle 200 to determine whether there is a problem with the vehicle 200. For example, the review entity 160 can be an automobile service facility or personnel of the automobile service facility. In some instances, the one or more review entities 160 can include any entity that can review vehicle operational data 175 so that the performance of the vehicle 200 or some aspect thereof can be modified, adjusted, upgraded, and/or improved. As an example, the review entity 160 can be a vehicle manufacturer or manufacturer of one or more subsystems or components of the vehicle 200. Such entities can, for example, review the vehicle operational data 175 to determine whether improvements can be made. For instance, a vehicle manufacturer may review vehicle operational data 175 to improve the autonomous operation of an autonomous vehicle.

The vehicle 200 will now be described in greater detail. Referring to FIG. 2, an example of the vehicle 200 is shown. The vehicle 200 can be any suitable type of vehicle. As used herein, "vehicle" means any form of motorized transport. In one or more implementations, the vehicle 200 can be an automobile. While arrangements will be described herein with respect to automobiles, it will be understood that embodiments are not limited to automobiles. In one or more implementations, the vehicle 200 may be a watercraft, an aircraft or any other form of motorized transport.

The vehicle 200 can include various elements. Some of the possible elements of the vehicle 200 are shown in FIG. 2 and will now be described. It will be understood that it is not necessary for the vehicle 200 to have all of the elements shown in FIG. 2 or described herein. The vehicle 200 can have any combination of the various elements shown in FIG. 2. Further, the vehicle 200 can have additional elements to those shown in FIG. 2. In some arrangements, vehicle 200 may not include one or more of the elements shown in FIG. 2. Further, while the various elements are shown as being located within the vehicle 200 in FIG. 2, it will be understood that one or more of these elements can be located external to the vehicle 200. Further, the elements shown may be physically separated by large distances.

The vehicle 200 can include one or more processors 210. The above description of the one or more processors 110 is equally applicable to the one or more processors 210. In some arrangements, the one or more processors 210 can be and/or can include the one or more processors 110. In one or more arrangements, one or more processors 210 can be a main processor of the vehicle 200. For instance, one or more processors 210 can be an electronic control unit (ECU) or an engine control unit.

The vehicle 200 can include one or more data stores 220 for storing one or more types of data. The above description of the one or more data stores 120 is equally applicable to the one or more data stores 220. In some arrangements, the one or more data stores 120 can be and/or can include the one or more data stores 220. The data store(s) 220 can be a component of the processor(s) 210, or the data store(s) 220 can be operatively connected to the processor(s) 210 for use thereby.

The vehicle 200 can include one or more transceivers 230. As used herein, "transceiver" is defined as a component or a group of components that transmit signals, receive signals or transmit and receive signals, whether wirelessly or through a hard-wired connection. The one or more transceivers 230 can be operatively connected to the one or more processors 210 and/or the one or more data stores 220. The one or more transceivers 230 can enable communications between the vehicle 200 and other elements of the system 100. The one or more transceivers 230 can be any suitable transceivers used to access a network, access point, node or other device for the transmission and receipt of data.

The one or more transceivers 230 may be wireless transceivers using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 230 can include any wireless technology developed in the future. Again, the one or more transceivers 230 can be any suitable combination of transceivers, including any combination of the transceivers noted above.

The vehicle 200 can include a sensor system 240. The sensor system 240 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time.

In arrangements in which the sensor system 240 includes a plurality of sensors, the sensors can work independently from each other. Alternatively, two or more of the sensors can work in combination with each other. In such case, the two or more sensors can form a sensor network. The sensor system 240 and/or the one or more sensors can be operatively connected to the processor(s) 210, the data store(s) 220, and/or other element of the vehicle 200 (including any of the elements shown in FIG. 1). The sensor system 240 can acquire data of at least a portion of the external environment of the vehicle 200.

The sensor system 240 can include any suitable type of sensor. Various examples of different types of sensors will be described herein. However, it will be understood that the embodiments are not limited to the particular sensors described.

The sensor system 240 can include one or more vehicle sensors 241. The vehicle sensor(s) 241 can be configured to detect, determine, assess, monitor, measure, quantify and/or sense information about the vehicle 200 itself. For instance, the vehicle sensor(s) 241 can be configured to detect, determine, assess, monitor, measure, quantify and/or sense position and orientation changes of the vehicle 200, such as, for example, based on inertial acceleration. In one or more arrangements, the vehicle sensor(s) 241 can include one or more accelerometers, one or more gyroscopes, an inertial measurement unit (IMU), a dead-reckoning system, a global navigation satellite system (GNSS), and/or other suitable sensors. The vehicle sensor(s) 241 can be configured to detect, determine, assess, monitor, measure, quantify, and/or sense one or more characteristics of the vehicle 200. In one or more arrangements, the vehicle sensor(s) 241 can include a speedometer (not shown). The speedometer can determine a current speed of the vehicle 200, or data acquired by the speedometer can be used to determine a current speed of the vehicle 200. In one or more arrangements, the vehicle sensor(s) 241 can include a yaw rate sensor, an attitude angle sensor, and/or an RPM sensor, just to name a few possibilities. In one or more arrangements, the vehicle sensor(s) 241 can include a timer, a clock, and/or any other device to measure time and/or acquire temporal data in any suitable manner.

In one or more arrangements, the vehicle sensor(s) 241 can include one or more sensors configured to detect, determine, assess, monitor, measure, quantify, and/or sense a position of a steering wheel of the vehicle 200 (e.g., a rotation angle of the steering wheel), the speed for each individual wheel of the vehicle 200, the speed of the vehicle 200, a position of an accelerator pedal of the vehicle 200, and/or a position of a brake pedal of the vehicle 200, just to name a few possibilities.

The sensor system 240 can include one or more microphones 242. "Microphone" is any device, component, system, and/or instrument that at least converts received sound data into electrical signals. Sound data can include sounds that are perceptible to the human sense of hearing and/or sounds that are not perceptible to the human sense of hearing. The sound data can be in any suitable form.

The one or more microphones 242 can be located in any suitable portion of the vehicle 200. For instance, one or more of the microphones 242 can be located within the vehicle 200 (e.g., in a vehicle occupant area). One or more of the microphones 242 can be located on the exterior of the vehicle 200. One or more of the microphones 242 can be located on or exposed to the exterior of the vehicle 200. One or more of the microphones 242 can be located proximate to one or more of the vehicle systems 260 or components thereof (e.g., shock absorbers, brakes, wheels, engine, etc.). When a plurality of microphones 242 is provided, the microphones can be distributed about the vehicle 200 in any suitable manner. In some instances, a plurality of microphones can be provided in a microphone array The position of one or more of the microphones 242 can be fixed such that its position does not change relative to the vehicle 200. One or more of the microphones 242 can be movable so that its position can change to allow audial data from different portions of the external environment of the vehicle 200 to be captured. The movement of one or more microphones 242 can be achieved in any suitable manner. The one or more microphones 242 and/or the movements of the one or more microphones 242 can be controlled by the sensor system 240, the processor 210 and/or any one or more elements of the vehicle 200.

Alternatively or in addition, the sensor system 240 can include one or more sensors configured to detect, determine, assess, monitor, measure, quantify and/or sense information about the external environment in which the vehicle 200 is located or portions thereof. For example, the one or more sensors can be configured to detect, determine, assess, monitor, measure, quantify and/or sense objects in at least a portion of the external environment of the vehicle 200 and/or information/data about such objects. Such objects may be stationary objects and/or dynamic objects. Various examples of such sensors will be described herein. However, it will be understood that the embodiments are not limited to the particular sensors described.

As an example, in one or more arrangements, the sensor system 240 can include one or more radar sensors 243. "Radar sensor" means any device, component and/or system that can detect, determine, assess, monitor, measure, quantify and/or sense something using at least in part radio signals. The one or more radar sensors 243 can be configured to detect, determine, assess, monitor, measure, quantify and/or sense, directly or indirectly, the presence of one or more objects in the external environment of the vehicle 200, the position of each detected object relative to the vehicle 200, the distance between each detected object and the vehicle 200 in one or more directions, the elevation of each detected object, the speed of each detected object and/or the movement of each detected object.

In one or more arrangements, the sensor system 240 can include one or more LIDAR sensors 244. "LIDAR sensor" means any device, component and/or system that can detect, determine, assess, monitor, measure, quantify and/or sense something using at least in part lasers. The LIDAR sensor can include a laser source and/or laser scanner configured to emit a laser signal and a detector configured to detect reflections of the laser signal. The one or more LIDAR sensors 244 can be configured to detect, determine, assess, monitor, measure, quantify and/or sense, directly or indirectly, the presence of one or more objects in the external environment of the vehicle 200, the position of each detected object relative to the vehicle 200, the distance between each detected object and the vehicle 200 in one or more directions, the elevation of each detected object, the speed of each detected object, and/or the movement of each detected object.

In one or more arrangements, the sensor system 240 can include one or more sonar sensors 245. "Sonar sensor" means any device, component and/or system that can detect, determine, assess, monitor, measure, quantify and/or sense something using at least in part sound waves. The one or more sonar sensors 245 can be configured to detect, determine, assess, monitor, measure, quantify and/or sense, directly or indirectly, the presence of one or more objects in the external environment of the vehicle 200, the position of each detected object relative to the vehicle 200, the distance between each detected object and the vehicle 200 in one or more directions, the elevation of each detected object, the speed of each detected object, and/or the movement of each detected object.

The sensor system 240 can include one or more cameras 246. "Camera" includes any device(s), component(s), and/or system(s) that is configured to capture visual data. "Visual data" includes video and/or image information/data. The visual data can be in any suitable form.

In one or more arrangements, one or more of the cameras 246 can be oriented, positioned, configured, operable, and/or arranged to capture visual data from at least a portion of the external environment of the vehicle 200. Visual data acquired by the one or more cameras 246 can be used to detect, determine, assess, monitor, measure, quantify and/or sense, directly or indirectly, the presence of one or more objects in the external environment of the vehicle 200, the position of each detected object relative to the vehicle 200, the distance between each detected object and the vehicle 200 in one or more directions, the elevation of each detected object, the speed of each detected object, and/or the movement of each detected object.

The one or more cameras 246 can be high resolution cameras. The high resolution can refer to the pixel resolution, the spatial resolution, spectral resolution, temporal resolution and/or radiometric resolution. In one or more arrangements, the one or more cameras 246 can be high dynamic range (HDR) cameras or infrared (IR) cameras.

In one or more arrangements, one or more of the cameras 246 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (color or monochrome). The image capture element may capture images in any suitable wavelength on the electromagnetic spectrum. The image capture element may capture color images and/or grayscale images. The one or more of the cameras 125 can be configured with zoom in and/or zoom out capabilities.

The one or more cameras 246 can be located in any suitable portion of the vehicle 200. For instance, one or more of the cameras 246 can be located within the vehicle 200 (e.g., in a vehicle occupant area). One or more of the cameras 246 can be located on the exterior of the vehicle 200. One or more of the cameras 246 can be located on or exposed to the exterior of the vehicle 200. As an example, one or more cameras 246 can be located on the roof of the vehicle 200. One or more of the cameras 246 can be located proximate to one or more of the vehicle systems 260 or components thereof (e.g., shock absorbers, brakes, wheels, engine, etc.). In one or more arrangements, one or more cameras 246 and/or one or more microphones 242 can be provided near the same vehicle system 260 or component(s) thereof. When a plurality of cameras 246 is provided, the cameras can be distributed about the vehicle 200 in any suitable manner.

The position of one or more of the cameras 246 can be fixed such that its position does not change relative to the vehicle 200. One or more of the cameras 246 can be movable so that its position can change to allow visual data from different portions of the external environment of the vehicle 200 and/or different portions of the interior of the vehicle 200 to be captured. The movement of the cameras 246 can be achieved in any suitable manner. For instance, the cameras 246 can be rotatable about one or more axes, pivotable, slidable, and/or extendable, just to name a few possibilities. In one or more arrangements, the cameras 246 can have any suitable range of motion, including, for example, substantially spherical, substantially hemi-spherical, substantially circular and/or substantially linear. The one or more cameras and/or the movement of the one or more cameras can be controlled by the sensor system 240, the processor 210 and/or any one or more other elements of the vehicle 200.

Alternatively or in addition to one or more of the above examples, the sensor system 240 can include one or more sensors configured to detect, determine, assess, monitor, measure, quantify and/or sense the location of the vehicle 200 and/or the location of objects in the environment relative to the vehicle 200. Any suitable sensor can be used for such purposes. Such sensors may work independently and/or in combination with a positioning system of the vehicle 200.

The vehicle 200 can include an input system 250. An "input system" is defined as any device, component, system, element or arrangement or groups thereof that enable information/data to be entered into a machine. The input system 250 can receive an input from a vehicle occupant (e.g., a driver or a passenger). Any suitable input system 250 can be used, including, for example, a keypad, display, touch screen, multi-touch screen, button, joystick, mouse, trackball, microphone and/or combinations thereof.

According to arrangements herein, the input system 250 can be configured to receive voice inputs from one or more vehicle occupants 150. In some instances, the input system 250 can be continuously monitoring for any voice data from a vehicle occupant 150. In some instance, the input system 250 can be configured to monitor for a particular identifier from a vehicle occupant 150 before voice inputs 170 are received from the vehicle occupant(s) 150. The identifier may be word(s), phrase(s), letter(s), number(s), and/or combinations thereof, just to name a few possibilities. The identifier can be assigned by a vehicle occupant, a vehicle owner, or some other entity.

The vehicle 200 can include an output system 255. An "output system" is defined as any device, component, system, element or arrangement or groups thereof that enable information/data to be presented to a vehicle occupant (e.g., a person, a vehicle occupant, etc.). The output system 255 can present information/data to a vehicle occupant. The output system 255 can include a display. Alternatively or in addition, the output system 255 may include a microphone, earphone and/or speaker. Some components of the vehicle 200 may serve as both a component of the input system 250 and a component of the output system 255.

The vehicle 200 can include one or more vehicle systems 260. Various examples of the one or more vehicle systems 260 are shown in FIG. 2. However, the vehicle 200 can include more, fewer or different systems. It should be appreciated that although particular vehicle systems are separately defined, each or any of the systems or portions thereof may be otherwise combined or segregated via hardware and/or software within the vehicle 200.

The vehicle 200 can include a propulsion system 261. The propulsion system 261 can include one or more mechanisms, devices, elements, components, systems, and/or combinations thereof, now known or later developed, configured to provide powered motion for the vehicle 200. The propulsion system 261 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 200.

The vehicle 200 can include wheels, tires and/or tracks. Any suitable type of wheels, tires and/or tracks can be used. In one or more arrangements, the wheels, tires and/or tracks of the vehicle 200 can be configured to rotate differentially with respect to other wheels, tires and/or tracks of the vehicle 200. The wheels, tires and/or tracks can be made of any suitable material.

The vehicle 200 can include a braking system 262. The braking system 262 can include one or more mechanisms, devices, elements, components, systems, and/or combinations thereof, now known or later developed, configured to decelerate the vehicle 200. As an example, the braking system 262 can use friction to slow the wheels/tires. The braking system 262 can convert the kinetic energy of the wheels/tires to electric current.

Further, the vehicle 200 can include a steering system 263. The steering system 263 can include one or more mechanisms, devices, elements, components, systems, and/or combinations thereof, now known or later developed, configured to adjust the heading of the vehicle 200.

The vehicle 200 can include a throttle system 264. The throttle system 264 can include one or more mechanisms, devices, elements, components, systems, and/or combinations thereof, now known or later developed, configured to control the operating speed of an engine/motor of the vehicle 200 and, in turn, the speed of the vehicle 200.

The vehicle 200 can include a transmission system 265. The transmission system 265 can include one or more mechanisms, devices, elements, components, systems, and/or combinations thereof, now known or later developed, configured to transmit mechanical power from the engine/motor of the vehicle 200 to the wheels/tires. For instance, the transmission system 265 can include a gearbox, clutch, differential, drive shafts, and/or other elements. In arrangements where the transmission system 265 includes drive shafts, the drive shafts can include one or more axles that are configured to be coupled to the wheels/tires.

The vehicle 200 can include a signaling system 266. The signaling system 266 can include one or more mechanisms, devices, elements, components, systems, and/or combinations thereof, now known or later developed, configured to provide illumination for the driver of the vehicle 200 and/or to provide information with respect to one or more aspects of the vehicle 200. For instance, the signaling system 266 can provide information regarding the vehicle's presence, position, size, direction of travel, and/or the driver's intentions regarding direction and speed of travel. For instance, the signaling system 266 can include headlights, taillights, brake lights, hazard lights and turn signal lights.

The vehicle 200 can include a navigation system 267. The navigation system 267 can include one or more mechanisms, devices, elements, components, systems, applications and/or combinations thereof, now known or later developed, configured to determine the geographic location of the vehicle 200 and/or to determine a travel route for the vehicle 200.

The navigation system 267 can include one or more mapping applications to determine a travel route for the vehicle 200. For instance, a driver or passenger may input an origin and a destination. The mapping application can determine one or more suitable travel routes between the origin and the destination. A travel route may be selected based on one or more parameters (e.g., shortest travel distance, shortest amount of travel time, etc.). In some arrangements, the navigation system 267 can be configured to update the travel route dynamically while the vehicle 200 is in operation.

The navigation system 267 can include a global positioning system, a local positioning system or a geolocation system. The navigation system 267 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 267 can use Transmission Control Protocol (TCP) and/or a Geographic information system (GIS) and location services.

The navigation system 267 may include a transceiver configured to estimate a position of the vehicle 200 with respect to the Earth. For example, navigation system 267 can include a GPS transceiver to determine the vehicle's latitude, longitude and/or altitude. The navigation system 267 can use other systems (e.g., laser-based localization systems, inertial-aided GPS, and/or camera-based localization) to determine the location of the vehicle 200. The navigation system 267 can be configured to acquire location data of the vehicle 200.

Alternatively or in addition, the navigation system 267 can be based on access point geolocation services, such as using the W3C Geolocation Application Programming Interface (API). With such a system, the location of the vehicle 200 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 200 is determined will depend on the manner of operation of the particular location tracking system used.

Responsive to detecting a command 180 in an occupant voice input 170 received from a vehicle occupant 150, the sensor system 240 can acquire vehicle operational data 175. The vehicle operational data 175 can be relevant to and/or based on the detected command 180. The vehicle operational data 175 can include data about the vehicle 200 (e.g., one or more of the vehicle systems 260 and/or one or more components thereof). The vehicle operational data 175 can include data about at least a portion of the external environment of the vehicle 200. The vehicle operational data 175 can be associated with one or more comments 185 provided by a vehicle occupant 150 in the occupant voice input 170. "Associated" or "associating" can include grouping the vehicle operational data 175 and the one or more comments 185 together in any suitable manner. "Associated" or "associating" can include combining or overlaying the one or more comments 185 and the vehicle operational data 175. "Associated" or "associating" can include making the vehicle operational data 175 and the one or more comments 185 available together in a common location. "Associated" or "associating" can include presenting the vehicle operational data 175 and the one or more comments 185 together in any suitable manner.

The vehicle 200 can include various modules, at least some of which will be described herein. The modules can be implemented as computer readable program code that, when executed by a processor, implement one or more of the various processes described herein. One or more of the modules can be a component of the processor 110, or one or more of the modules can be executed on and/or distributed among other processing systems to which the processor 110 is operatively connected. The modules can include instructions (e.g., program logic) executable by one or more processor 110. Alternatively or in addition, one or more data store 120, 220 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In one or more arrangements, the vehicle 200 can include the one or more voice input analysis modules 130 or at least a portion of one or more voice input analysis modules 130. The above description of the voice input analysis module(s) 130 presented in connection with FIG. 1 is equally applicable here. While FIG. 2 shows the vehicle 200 as having the voice input analysis module(s) 130, it will be understood that arrangements are not limited in this regard. Indeed, in some instances, the vehicle 200 may not include the voice input analysis module(s) 130. Instead, the voice input analysis module(s) 130 can be located remote from the vehicle 200; however, the vehicle 200 can be operatively connected to the voice input analysis module(s) 130.

The vehicle 200 can include one or more autonomous driving modules 270. The autonomous driving module(s) 270 can be configured to perform various functions, including, for example, environment perception, planning/decision-making, and/or control.

The autonomous driving module(s) 270 can receive data from the sensor system 240 and/or any other type of system capable of capturing information relating to the external environment surrounding a vehicle. The autonomous driving module(s) 270 can use such data to create a background map format, including information specific to both stationary and moving objects such as traffic signs, natural objects, moving vehicles, pedestrians, or other localized position data and/or signals, and output corresponding data and/or signals to the processor(s) 210. The autonomous driving module(s) 270 can determine vehicle position and velocity data. The autonomous driving module(s) 270 can determine the location of obstacles, objects, or other environmental features including traffic signs, trees, shrubs, neighboring vehicles, pedestrians, etc. One or more of the vehicle systems 260 can be operatively connected to the autonomous driving module(s) 270. The autonomous driving module(s) 270 can be configured to receive, capture, and/or determine data indicative of performance of the vehicle systems 260.

The autonomous driving module(s) 270 can be configured to receive, acquire, capture, and/or determine location information for objects within the environment surrounding the vehicle 200 for use by the processor(s) 210 and/or other element(s) of the vehicle 200. The autonomous driving module(s) 270 can estimate position and orientation of the vehicle 200, images for processing by an image sensor, vehicle position in global coordinates based on signals from a plurality of satellites, or any other data and/or signals that could be used to determine the current state of the vehicle 200 or to determine the position of the vehicle 200 in respect to its environment for use in either creating a map format or determining the position of the vehicle 200 with respect to the map format.

Scene models can be constructed using location-based geographic features captured by the vehicle 200 for road-based objects such as traffic lights, traffic signs, lane lines, crosswalks, and curbs proximate to the vehicle 200 as it travels along a travel route. Information representing these geographic features can be captured by, for example, using the sensor system 240 in combination with an algorithm such as a random sample consensus (RANSAC) to differentiate lines, record the position of the vehicle 200, and collect data on position from a GNSS and/or an IMU. The captured information for these geographic features can then be manipulated using a simultaneous localization and mapping (SLAM) technique to position all of the geographic features in relation to the position of the vehicle 200.

Alternatively, scene models can be constructed using overhead images (e.g., satellite images) of geographic features traced by a map editor that allows selection of different categories for each geographic feature, for example, traffic sign, road marking, etc. Any scene model used and/or created by the vehicle 200 can be stored, for example, in the data stores 220. A background scene model can be constructed using location information for geographic features that are able to be ignored during moving object detection and tracking processes performed by the vehicle 200 for decision making while traveling a planned vehicle path. This group of geographic features, that is, background objects, can include stationary road-based objects, or road features, such as traffic signs, guardrails, berms, etc., and mostly stationary natural objects such as trees, shrubs, or bushes that can produce foliage.

The autonomous driving module(s) 270 can be configured to determine path(s), current driving maneuvers for the vehicle 200, future driving maneuvers and/or modifications to current driving maneuvers based on data acquired by the sensor system 240, scene models, and/or data from any other suitable source. In some arrangements, the autonomous driving module(s) 270 can determine one or more potential driving maneuvers for the vehicle 200 at any point in time. "Driving maneuver" means one or more actions that affect the movement of a vehicle. Examples of driving maneuvers include: accelerating, braking, turning, moving in a lateral direction of the vehicle 200, changing travel lanes, merging into a travel lane, and/or reversing, just to name a few possibilities.

The autonomous driving module(s) 270 can cause, directly or indirectly, one or more determined driving maneuvers to be implemented. As used herein, "cause" or "causing" means to make, force, compel, direct, command, instruct, and/or enable an event or action to occur or at least be in a state where such event or action may occur, either in a direct or indirect manner.

The processor 110 and/or the autonomous driving module(s) 270 may be operable to control the navigation and/or maneuvering of the vehicle 200 by controlling one or more of the vehicle systems 260 and/or components thereof. For instance, when operating in an autonomous mode, the processor 110 and/or the autonomous driving module(s) 270 can control the direction and/or speed of the vehicle 200. The processor 110 and/or the autonomous driving module(s) 270 can cause the vehicle 200 to accelerate (e.g., by increasing the supply of fuel provided to the engine), decelerate (e.g., by decreasing the supply of fuel to the engine and/or by applying brakes) and/or change direction (e.g., by turning the steering wheel and/or one or more of the wheels of the vehicle 200).

The autonomous driving module(s) 270 can be configured to execute various vehicle functions and/or to transmit data to, receive data from, interact with, and/or control the vehicle 200 or one or more systems thereof (e.g., one or more of vehicle systems 260). The processor(s) 210 and/or the autonomous driving module(s) 270 can be operatively connected to communicate with the vehicle systems 260 and/or individual components thereof. For example, the processor(s) 210 and/or the autonomous driving module(s) 270 can be in communication to send and/or receive information from the various vehicle systems 260 to control the movement, speed, steering, accelerating, braking, maneuvering, heading, direction, etc. of vehicle 200. The processor(s) 210 and/or the autonomous driving module(s) 270 may control all of these vehicle systems 260 or some subset thereof and, thus, may be partially or fully autonomous.

The vehicle 200 can include one or more actuators (not shown). The actuators can be any element or combination of elements operable to modify, adjust and/or alter one or more of the vehicle systems 260 or components thereof to responsive to receiving signals or other inputs from the processor 210, the autonomous driving module(s) 270, and/or other element of the vehicle 200. Any suitable actuator can be used. For instance, the one or more actuators can include motors, pneumatic actuators, hydraulic pistons, relays, solenoids, and/or piezoelectric actuators, just to name a few possibilities.

Now that the various potential systems, devices, elements and/or components have been described, various methods of using such systems, devices, elements and/or components will now be described. Referring now to FIG. 3, an example of a method 300 a method acquiring vehicle operational data responsive to receiving an occupant voice input is shown. Various possible steps of method 300 will now be described. The method 300 illustrated in FIG. 3 may be applicable to the embodiments described above in relation to FIGS. 1-2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, an occupant voice input 170 can be received from a vehicle occupant 150. The occupant voice input 170 can be received while the vehicle 200 is in operation. "In operation" includes instances in which the vehicle 200 is in motion, as well as when the vehicle 200 is stopped or standing while at least a portion of the vehicle 200 is activated. The occupant voice input 170 can be received by the input system 250 and/or one or more microphones 242 of the sensor system 240. The method 300 can continue to block 320.

At block 320, the received occupant voice input 170 can be analyzed to determine whether a vehicle diagnostic command 180 is included in the occupant voice input 170. The analysis can be performed by, for example, the processor(s) 110, the processor(s) 210, and/or the voice input analysis module(s) 130. The analysis can be performed in real-time. The analysis can be performed onboard the vehicle 200 or in a remote computing system (e.g., a cloud-based server, a remote computing system, etc.). Any suitable analysis can be performed. The method 300 can continue to block 330.

At block 330, responsive to detecting that a vehicle diagnostic command 180 is included in the received occupant voice input 170, one or more sensors of the sensor system 240 can be caused to acquire vehicle operational data 175 based on the vehicle diagnostic command 180. The vehicle diagnostic command 180 can be processed by, for example, the processor(s) 110 and/or the processor(s) 210 to control the sensor system 240. In one or more arrangements, all available vehicle operational data 175 can be obtained from the entire sensor system 240. In one or more arrangements, an appropriate subset of sensors of the sensor system 240 can be caused to acquire vehicle operational data 175 based on the vehicle diagnostic command 180. In one or more arrangements, a plurality of different types of vehicle sensors can be caused to acquire vehicle operational data 175 based on the vehicle diagnostic command. For example, vehicle operational data 175 can be acquired by one or more microphones 242 and/or one or more cameras 246. The method 300 can continue to block 340.

At block 340, the vehicle operational data 175 can be presented to a user. Such presenting can occur in any suitable manner. For instance, the vehicle operational data 175 can be presented on a display, printed on paper or other media, output over a speaker, or in any other suitable manner. In one or more arrangements, the vehicle operational data 175 can be reviewed and/or analyzed by one or more review entities 160. The presenting can occur at any suitable time. In one or more arrangements, the presenting can occur upon request or access by a review entity 160. In one or more arrangements, the presenting can occur after vehicle operation has stopped. For instance, the acquired vehicle operational data 175 can be stored (e.g., in one or more data store(s) 120, 220) for subsequent retrieval. In one or more arrangements, the presenting can occur during vehicle operation. For instance, the vehicle operational data 175 can be presented to a remote review entity 160.

The method 300 can end. Alternatively, the method 300 can return to block 310 or some other block. The method 300 can repeat at any suitable point, such as at a suitable time or upon the occurrence of any suitable event or condition. As a further alternative, the method 300 can include additional and/or alternative blocks (not shown). For instance, if a comment 185 is detected in the occupant voice input 170, such a comment can be associated with vehicle operational data 175 acquired in response to receiving a command. In one or more arrangements, the vehicle operational data 175 can be presented along with any other data associated with the vehicle operational data 175 (e.g., any vehicle occupant comments 185 and/or other data). In such instances, the other data can be presented separately from the vehicle operational data 175 or together with the vehicle operational data 175. For example, when the vehicle operational data 175 includes vehicle audial data, the vehicle occupant comments 185 can be output together with the vehicle audial data. For instance, the vehicle occupant comments 185 can be overlaid over the vehicle audial data using associated temporal data.

A non-limiting example of a method acquiring vehicle operational data responsive to receiving an occupant voice command is in accordance with systems and methods described herein will now be presented. While the vehicle 200 is in operation, a driver may notice that the vehicle 200 is making an unusual or annoying noise (e.g., a rattling, knocking, ticking, etc.), which might not repeat often. The driver may say "Record vehicle sounds" aloud. The input system 250 can acquire this voice input. The acquired voice input can be analyzed by the voice input analysis module 130, which can detect that the driver has provided a command. In response, the sensor system 240 can activate one or more microphones 242 to acquire all sound data within the vehicle 200. In some instances, the sensor system 240 can also acquire sounds from an indicated portion of the vehicle 200. For instance, the command 180 may be to "record vehicle sounds on the left side of the vehicle." In such case, the sensor system 240 can acquire sounds from one or more microphones 242 in the appropriate location consistent with the command.

The vehicle operational data 175 can be stored for later review, such as in one or more data store(s) 120, 220. For instance, the driver may wish to review the sounds. Alternatively or in addition, the vehicle operational data 175 can be presented to a technician at a vehicle service center. The technician can review the vehicle operational data 175 or a portion thereof is available. As an example, the technician can listed to audial data included in the vehicle operational data 175. Such information may be useful in assisting the technician to diagnose whether there is a problem with the vehicle 200.

Another non-limiting example of a method acquiring vehicle operational data responsive to receiving an occupant voice command is in accordance with systems and methods described herein will now be presented. In this example, the vehicle 200 can be an autonomous vehicle. While in operation, the vehicle 200 may encounter an unusual or interesting road condition, traffic condition, and/or environmental condition. For instance, the road may be covered in snow. Such a condition may be relevant to improving performance of the vehicle 200.

In such case, a vehicle occupant 150 may say "Record driving environment" or other similar expression aloud. The input system 250 can receive this as an occupant voice input 170. The received occupant voice input 170 can be analyzed by the voice input analysis module 130, which can detect whether the vehicle occupant 150 has provided a command. If a command 180 is detected in the occupant voice input 170, the vehicle 200 can cause the sensor system 240 to activate one or more sensors to acquire vehicle operational data 175 from at least the external environment of the vehicle 200. The sensor system 240 can also activate one or more vehicle sensors 241 to record data about the vehicle 200.

While the vehicle 200 is operating in such conditions, the vehicle occupant 150 may provide one or more comments 185 and/or one or more additional commands 180. The comment(s) 185 can be associated with the acquired vehicle operational data 175 in any suitable manner. The comment(s) 185 can provide addition information and/or context to a subsequent reviewer of the acquired vehicle operational data 175. In some instances, other data (e.g., temporal data, location data, etc.) can be associated with the acquired vehicle operational data 175. In one or more arrangements, the other data can be automatically associated with the acquired vehicle operational data 175, or the other data can be associated with the acquired vehicle operational data 175 based on a user command or other user input.

A review entity 160 can review the acquired vehicle operational data 175 in real-time or at a later time. In one or more arrangements, the acquired vehicle operational data 175 can be presented to an engineer or other person who may try to refine or improve the performance of the autonomous vehicle based on the vehicle operational data 175 acquired in this unusual driving condition.

It will be appreciated that arrangements described herein can provide numerous benefits, including one or more of the benefits mentioned herein. For example, arrangements described herein can enable enhanced communications between a vehicle and a vehicle. Arrangements described herein can provide convenience for a vehicle occupant by providing a voice interface to initiate one or more commands (e.g., vehicle operational data recording). Arrangements described herein may improve safety, as a vehicle occupant (especially the driver) can provide commands and/or comments hands-free while the vehicle is in operation, thereby keeping the focus on the road. Arrangements described herein can acquire information/data useful for subsequent situational analysis (improving driving behavior, possible repair, etc.).

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of acquiring vehicle operational data of a vehicle, the method comprising:
   receiving a voice input from a vehicle occupant while the vehicle is in operation;
   analyzing the received voice input to determine whether a vehicle diagnostic command or one or more occupant comments is included in the voice input;
   responsive to detecting that a vehicle diagnostic command is included in the received voice input, causing a plurality of different types of vehicle sensors to acquire vehicle operational data based on the vehicle diagnostic command and storing the acquired vehicle operational data;
   responsive to detecting that one or more occupant comments is included in the received voice input, storing the one or more occupant comments; and
   presenting any stored vehicle operational data and any stored one or more occupant comments to a user.

2. The method of claim 1, wherein analyzing the received voice input to determine whether a vehicle diagnostic command or one or more occupant comments is included in the voice input is performed in real-time, and wherein causing the plurality of different types of vehicle sensors to acquire vehicle operational data based on the vehicle diagnostic command is performed in real-time.

3. The method of claim 1, wherein presenting any stored vehicle operational data and any stored one or more occupant comments to a user is performed after vehicle operation has stopped.

4. The method of claim 1, further including:
   automatically associating temporal data with the acquired vehicle operational data.

5. The method of claim 1, further including:
   automatically associating location data with the acquired vehicle operational data.

6. The method of claim 1, wherein analyzing the received voice input to determine whether a vehicle diagnostic command or one or more occupant comments is included in the voice input includes analyzing the received voice input to determine whether a vehicle diagnostic command or one or more occupant comments is included in the voice input using natural language processing.

7. The method of claim 1, wherein the vehicle diagnostic command is a command to record vehicle sounds, and wherein causing one or more vehicle sensors to acquire vehicle operational data based on the vehicle diagnostic command includes causing one or more microphones to acquire vehicle audial data.

8. The method of claim 1, further including:
   responsive to detecting one or more directional indicators in the voice input, causing one or more vehicle sensors to acquire vehicle operational data in a location of the vehicle based on the one or more directional indicators.

9. The method of claim 1, wherein vehicle is an autonomous vehicle, wherein the vehicle diagnostic command relates to an unexpected scene encountered in an external environment of the autonomous vehicle while operating in an autonomous mode, and wherein causing one or more vehicle sensors to acquire vehicle operational data based on the vehicle diagnostic command includes causing one or more vehicle sensors to acquire driving environment data consistent with the vehicle diagnostic command.

10. A vehicle having a voice-based user interface for vehicle occupants, the vehicle comprising:
    a sensor system including a plurality of sensors, the plurality of sensors being distributed about a plurality of different locations of the vehicle; and
    a processor operatively connected to receive vehicle operational data from the sensor system, the processor being programmed to initiate executable operations comprising:
       responsive to receiving a voice input from a vehicle occupant while the vehicle is in operation, analyzing the received voice input to determine whether a vehicle diagnostic command or one or more occupant comments is included in the voice input; and
       responsive to detecting that a vehicle diagnostic command is included in the received voice input, causing a plurality of different types of vehicle sensors to acquire vehicle operational data based on the vehicle diagnostic command and causing the acquired vehicle operational data to be stored;
       responsive to detecting that one or more occupant comments is included in the received voice input, causing the one or more occupant comments to be stored; and
       causing any stored vehicle operational data and any stored one or more occupant comments to be presented to a user.

11. The vehicle of claim 10, wherein analyzing the received voice input to determine whether a vehicle diagnostic command is included in the voice input is performed in real-time, and wherein causing the plurality of different types of vehicle sensors to acquire vehicle operational data based on the vehicle diagnostic command is performed in real-time.

12. The vehicle of claim 10, further including:
    automatically associating at least one of temporal data or location data with the acquired vehicle operational data.

13. The vehicle of claim 10, wherein analyzing the received voice input to determine whether a vehicle diagnostic command or one or more occupant comments is included in the voice input includes analyzing the received voice input to determine whether a vehicle diagnostic command or one or more occupant comments is included in the voice input using natural language processing.

14. The vehicle of claim 10, wherein the vehicle diagnostic command is a command to record vehicle sounds, and wherein causing one or more vehicle sensors to acquire vehicle operational data consistent with the vehicle diagnostic command include causing one or more microphones to acquire vehicle audial data.

15. The vehicle of claim 10, wherein the vehicle is an autonomous vehicle.

16. A system for a vehicle, the system comprising:
a sensor system including a plurality of microphones, the plurality of microphones being distributed about a plurality of different locations of the vehicle, the plurality of microphones being configured to acquire vehicle audial data; and
a processor operatively connected to receive vehicle audial data from the plurality of microphones, the processor being programmed to initiate executable operations comprising:
responsive to receiving a voice input from a vehicle occupant while the vehicle is in operation, analyzing the received voice input in real-time to determine whether a command to record vehicle sounds or one or more occupant comments is included in the voice input;
responsive to detecting that a command to record vehicle sounds is included in the received voice input:
determining whether the command to record vehicle sounds includes one or more directional indicators, whereby the one or more directional indicators specify one or more particular areas of the vehicle, and the one or more directional indicators including at least one of: right, left, center, forward, rear, or side;
causing one or more microphones to acquire vehicle audial data based on the command and, if one or more directional indicators is included in the command, in a location of the vehicle based on the one or more directional indicators; and
causing the acquired vehicle audial data to be stored;
responsive to detecting that one or more occupant comments is included in the received voice input, causing the one or more occupant comments to be stored; and
causing any stored vehicle audial data and any stored one or more occupant comments to be presented to a user.

\* \* \* \* \*